UNITED STATES PATENT OFFICE.

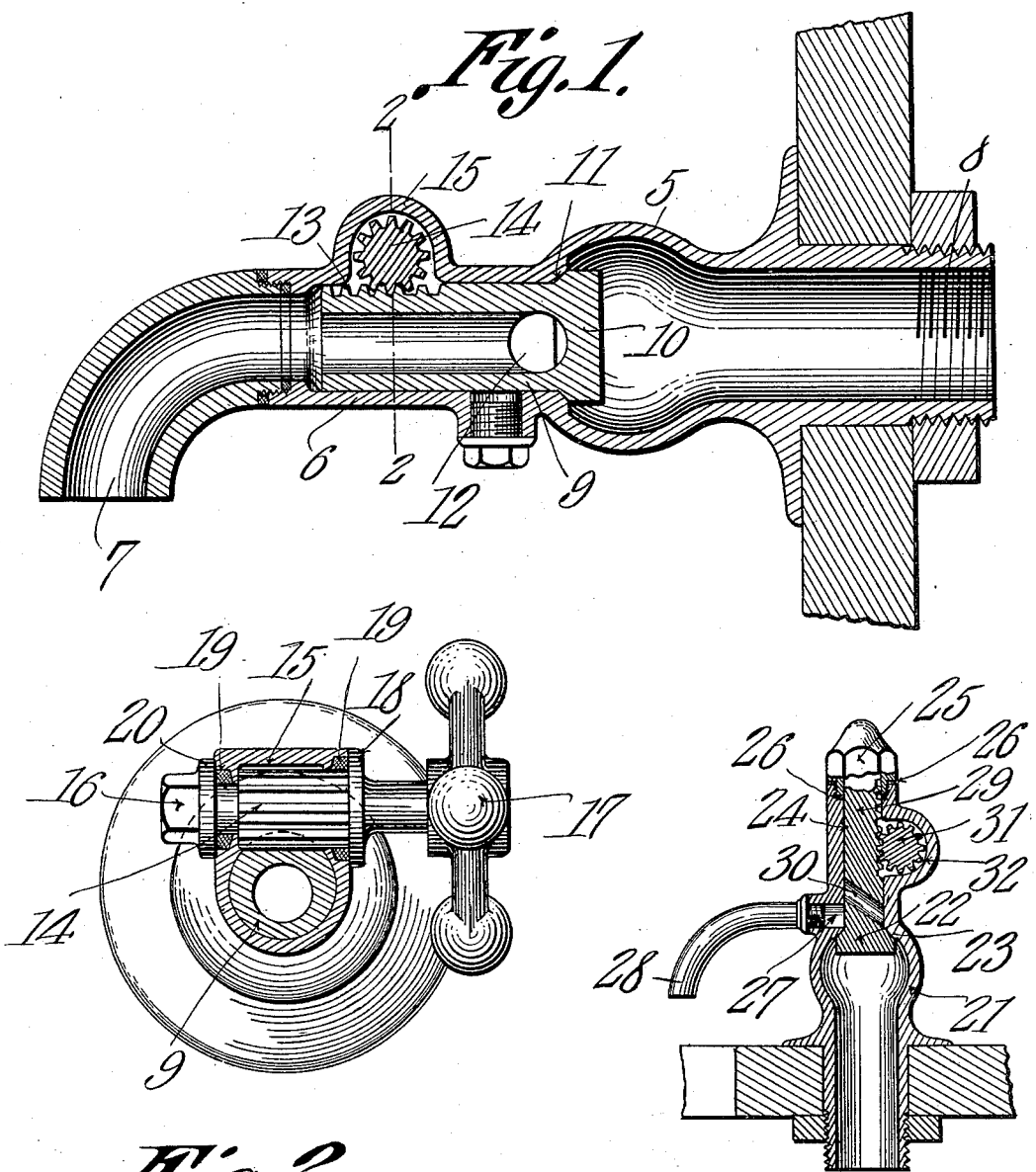

JOHN A. PETRO, OF LORAIN, OHIO.

FAUCET.

960,695.  Specification of Letters Patent.  Patented June 7, 1910.

Application filed March 3, 1910. Serial No. 547,104.

*To all whom it may concern:*

Be it known that I, JOHN A. PETRO, a citizen of the United States, residing at Lorain, in the county of Lorain and State of Ohio, have invented a new and useful Faucet, of which the following is a specification.

This invention has reference to valves designed more particularly for use in connection with wash basins, sinks, and other plumbing fixtures, and it has for its object to provide a valve of this kind embodying certain novel and improved structural details to be hereinafter described and claimed, and also to provide a valve which can be tightly closed, together with improved valve operating means.

In the accompanying drawings, Figure 1 is a longitudinal section of a valve designed for use in connection with a kitchen sink. Fig. 2 is a transverse section on the line 2—2 of Fig. 1. Fig. 3 is a vertical section of a valve designed for use in connection with a wash basin.

Referring to Figs. 1 and 2 of the drawing, 5 denotes a valve casing formed with a reduced tubular extension 6 terminating in a downwardly extending outlet spout 7. The casing 5 has an exteriorly threaded portion 8 for connection to the service pipe.

The valve proper is a tubular stem 9 which is slidably mounted in the bore of the tubular extension 6, it fitting snugly therein. One end of the stem 9 has a head or enlargement 10 beveled on one side as indicated at 11 to seat on a correspondingly beveled surface at that end of the bore of the tubular extension 6 which opens into the casing 5. The stem has, adjacent to the head 10, a side opening or port 12 into the bore of the stem. The bore of the stem opens into that end of the stem opposite the end carrying the head 10, said open end of the bore being located, adjacent to the inlet end of the spout 7, so as to discharge thereinto. When the stem is retracted so as to carry the head 10 away from the valve seat, and to bring the port 12 past said seat, the water flows from the interior of the casing 5 through said port 12, and through the bore of the stem 9 into the spout 7, and is discharged therefrom. When the head 10 is seated over the inlet end of the bore of the tubular extension 6, the port 12 is located within the said bore, whereby the water is shut off. No flow of water can take place until the stem 9 is moved inwardly sufficiently to bring the port 12 past the seat of the head 10 into the casing 5.

The following means are provided for opening and closing the valve: The stem 9 is formed on top, near its outer end, with rack teeth 13 which are in mesh with a pinion 14 mounted in a chamber 15 formed integral with the part 6, near its outer end and extending transversely thereof. The pinion is formed on a shaft passing through the end walls of the chamber 15, there being openings in said walls for this purpose. On one of the projecting ends of the shaft is screwed a nut 16, and the other projecting end of the shaft is fitted with a hand wheel 17. The last mentioned end of the shaft is also formed with an annular shoulder 18 bearing against the outer surface of the adjacent end wall of the chamber. The openings in the end walls of the chamber through which the shaft passes are countersunk to receive packing rings 19, one of said rings being held in place by the shoulder 18, and the other ring by a shoulder 20 at the base of the nut 16. A turn of the hand wheel 17 rotates the pinion 14, and as said pinion is in mesh with the rack teeth 13, the rotary movement of the pinion imparts a reciprocatory movement to the stem 9, whereby the valve is opened and closed in the manner already described. A slight turn of the hand wheel suffices to open or close the valve. The seat which is engaged by the head 10 will be carefully ground, so that a tight closure is effected.

The valve herein described is horizontally positioned, and is more particularly adapted for kitchen sinks and similar fixtures.

Fig. 3 shows a slightly modified valve structure, designed for wash basins and the like, this form of valve being vertically positioned.

Referring to Fig. 3, 21 denotes the casing of the valve, the same being suitably constructed at one of its ends for connection to the service pipe. The valve proper is a disk or head 22 beveled on one side and engaging a beveled seat 23 at the inner end of a bore 24 opening at said end into the interior of the valve casing, and the opposite end opening to the outside of said casing, the last mentioned end of said bore being closed by a screw cap 25 screwing on the corresponding end of the valve casing, there being washers 26 interposed between the cap and the casing to make a water tight joint. That portion of the valve casing containing the bore 24 has a port or side opening 27 into said bore, to which port is connected a downwardly extending discharge spout 28.

The valve head 22 is carried by a stem 29 suitably shaped to fit snugly in the bore 24, in which it is slidably mounted. The stem is formed with an oblique water way or port 30, and said port is so positioned that when the head 22 is seated, it lies within the bore 24. When the valve head is unseated, one end of the port is located below the valve seat, and the other end of the port is in communication with the port 27. In the last mentioned position, the water is free to flow through the port 30 into the port 27, and out of the spout 28.

The valve is operated by means of a pinion 31 working in a chamber 32 formed on one side of the valve casing, said pinion being in mesh with rack teeth formed on the stem 29. The pinion is operated in the same manner as the one employed for operating the first described valve.

It will be noted that the valve casing, in both forms of valves, is the same, which greatly reduces the cost of manufacture, and enables the casing to be used in either position shown. If used as shown in Fig. 1, the cap 25 is removed, and the spout 7 is screwed on the corresponding end of the casing and the boss to which the spout 28 in Fig. 3 is connected, is left off or plugged up. It will also be noted that the pressure is behind the head 10, in view of which the closing movement of the valve is assisted by this pressure, and the same also holds the head tightly seated. The valve can also be made to close automatically upon unscrewing the nut 16 sufficiently to loosen up the pinion shaft so that, upon releasing the hand wheel 17, the pressure against the rear of the head 10, forces the same to its seat, on which it is tightly held.

What is claimed is:

A valve outfit comprising a casing having an inlet and a tubular extension, said extension having separate outlets located at the end and side respectively, and each of said outlets being adapted for connection of a discharge spout thereto, a valve working in the bore of the extension, and a closure for the outlet not in use.

In testimony that I claim the foregoing as my own, I have hereto affixed my signature in the presence of two witnesses.

JOHN A. PETRO.

Witnesses:
C. E. HOYLE,
GEO. B. PITTS.